May 14, 1963  J. F. MILLER, JR  3,089,259
MINIATURE SOLAR SYSTEM DISPLAYS
Filed June 1, 1961  3 Sheets-Sheet 1
FIG. 1
FIG. 2
FIG. 9
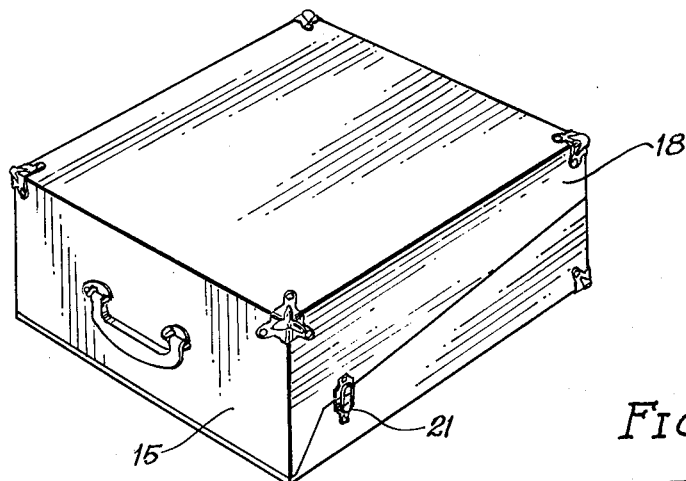
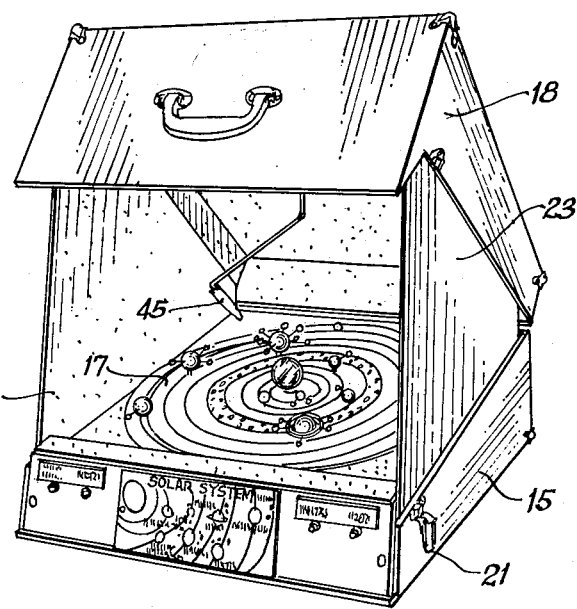
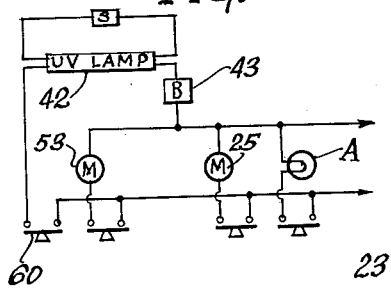
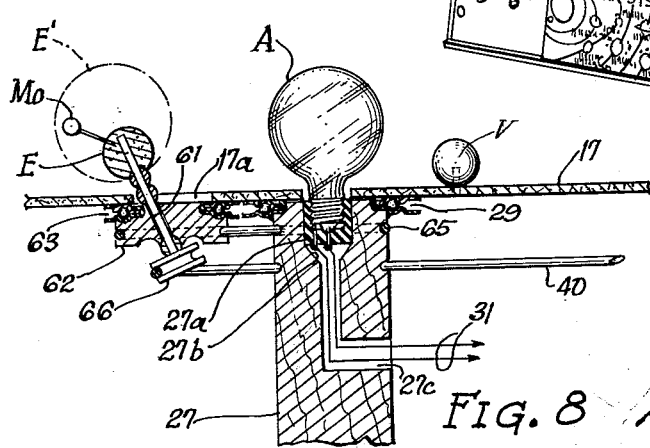
FIG. 8
INVENTOR:
Jennings F. Miller Jr.
BY
Stevens, Lehrer + Stevens
Att'ys.

May 14, 1963    J. F. MILLER, JR    3,089,259
MINIATURE SOLAR SYSTEM DISPLAYS
Filed June 1, 1961    3 Sheets-Sheet 2

INVENTOR:
Jennings F. Miller Jr.
BY
Stevens, Lehrer + Stevens
Att'ys.

May 14, 1963    J. F. MILLER, JR    3,089,259
MINIATURE SOLAR SYSTEM DISPLAYS
Filed June 1, 1961    3 Sheets-Sheet 3

INVENTOR:
Jennings F. Miller Jr.
BY
Stevens, Lehrer & Stevens
Att'ys.

United States Patent Office 3,089,259
Patented May 14, 1963

3,089,259
MINIATURE SOLAR SYSTEM DISPLAYS
Jennings F. Miller, Jr., Franklin Park, Ill.
(329 N. Elmwood Ave., Oak Park, Ill.)
Filed June 1, 1961, Ser. No. 123,919
5 Claims. (Cl. 35—45)

My invention relates to displays illustrative of planetary subjects, and designed more particularly for the simulation of planetary placements and movements for educational purposes. Much has been done along this line graphically; and models have been built which show positions of planets and make it possible for symbols thereof to be moved or rotated by hand to illustrate their action.

One object of the present invention is to lend the above subject wider scope by extending the display to the entire group of planets and satellites which moves in relation to the sun.

Another object is to simulate the revolving movement of the planets around the sun by mounting replicas thereof on a turntable with a replica of the sun in the center, the simulated planets being arranged as known in astronomy, and the revolving travel of the planets being simulated by the continuous rotation of the turntable.

Another object is to coat the simulated planets, or portions thereof with a fluorescent substance, and direct ultra-violet rays over the turntable in a darkened enclosure, whereby to render the planets luminous.

A further object is to install the planetary display in a cabinet whose lid opens to form a hood, and whose sides are supplemented by wings which shield the display from daylight on the sides while the hood does the same from the top.

An additional object is to install a concealed motor drive in the lower part of the cabinet effective to rotate the planet symbols in the same direction as that of their revolution around the sun symbol.

A still further object is to incorporate a simulated comet in the display, with means for moving the same in a course in keeping with principles of astronomy.

An important object is to incorporate the display in a cabinet which is compact and easily portable.

A better understanding of the invention may be had by reference to the accompanying drawings, in which:

FIG. 1 is a perspective view of the cabinet incorporating the novel planetary display, in closed position;

FIG. 2 is a similar view of the cabinet opened in a position to reveal the display;

FIG. 8 is a sectional enlargement of the showing in the bottom center of FIG. 6; and FIG. 9 is a diagram of the electrical circuit employed in the display.

Figure 3:
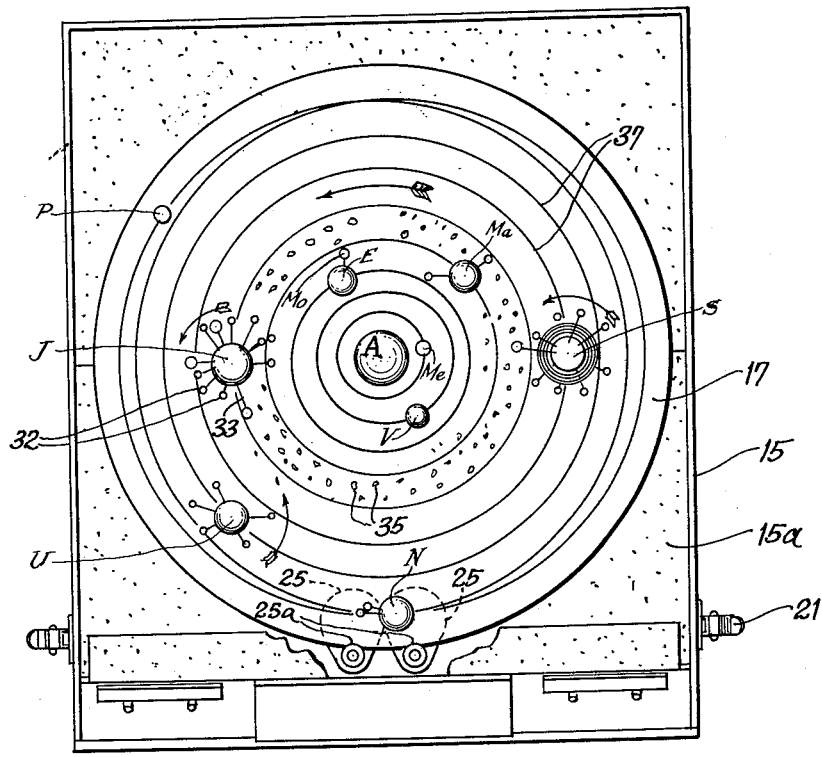
FIG. 3 is a top plan view of the display, on a larger scale.

Referring specifically to the drawings, 15 denotes the cabinet for the display, the same having a top 15a in which the turntable 17 for the planet symbols is located. The cabinet has a cover 18 which is hinged at the rear, as indicated at 19. Side clasps 21 keep the cover closed when the display is not being viewed; and side wings 23 hinged in the cover 18 as seen in FIG. 6 prop the cover up as seen in FIG. 2 when the display is being viewed.

The turntable 17 is designed to be driven by a pair of small electric motors 25 arranged side-by-side, as indicated in FIG. 3. These have pulleys 25a in frictional engagement with the rim of the turntable; and FIG. 6 shows that the motors are mounted in hinged relation at 25b to a base in the bottom of the cabinet. The frame of each motor is extended with an arm 25c receiving a drawspring 25d for urging the engagement of the motor pulleys with the turntable. The small dual motors are preferred over a larger single motor because they are more compact and less apt to become overheated.

Figure 6:
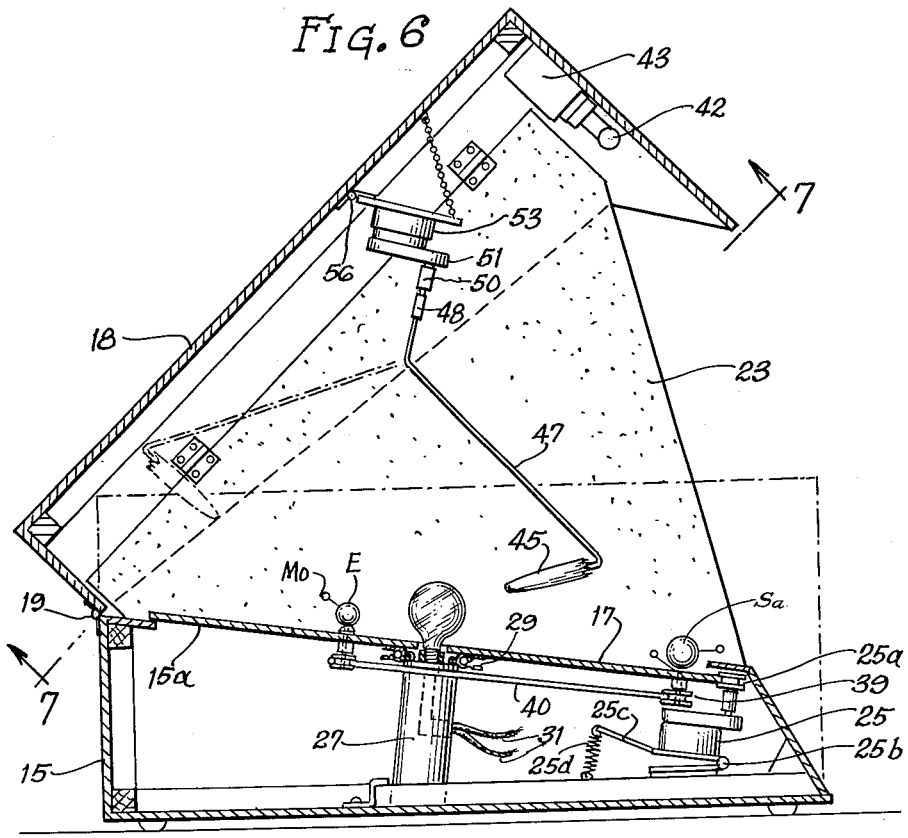
FIG. 6 is an enlarged vertical section of the showing in FIG. 2, as viewed from the arrow 6 at the bottom thereof.

The turntable 17 is tilted forward to a limited degree for a better view of its rear portion; and it is supported on a tilted post 27 in the center of the cabinet with the facility of a ball bearing 29, as seen in FIGS. 6 and 8.

The sun symbol is carried by the center post 27, while those of the planets, satellites and asteroids are carried by the turntable. Thus, the sun symbol is a lamp A set in a socket 27a embedded in a cavity 27b made in the top of the post; and the cavity has a bore continuation 27c for the outward passage of the lamp wires 31. The sun symbol is, therefore, in a fixed position. As to the other planet symbols, they are journaled for independent rotation in the turntable 17. Thus, the symbol for the Earth is indicated at E, that for the Moon at Mo, that for Jupiter at J, that for Mercury at Me, that for Mars at Ma, that for Neptune at N, that for Pluto at P, that for Saturn at S, that for Uranus at U, and that for Venus at V. Satellites for the various planets are represented by small spheres 32 of various sizes, which are projected from the planet symbols by pins 33 in directions more or less following the known positions of the satellites. The asteroids are represented by small spots 35 extending in a circular path about the sun symbol. A series of circles 37 marked on the turntable represent the orbits of corresponding planets.

Figure 4:
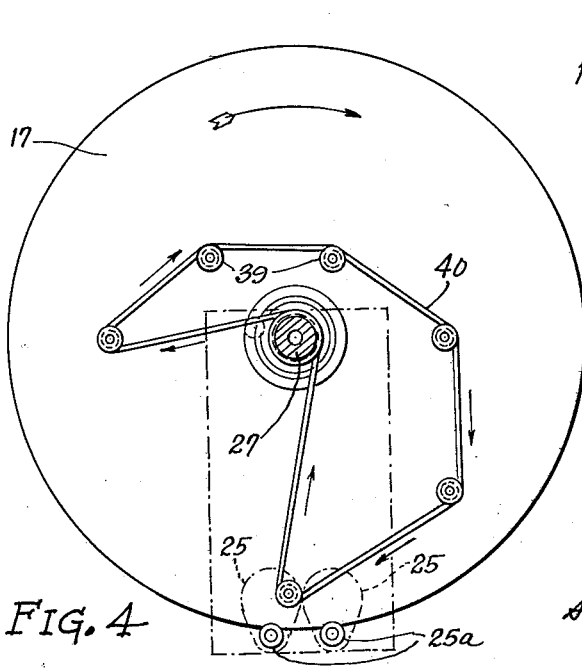
FIG. 4 is a bottom view of the turntable, showing the drive for the same and the planet symbols.
Figure 5:
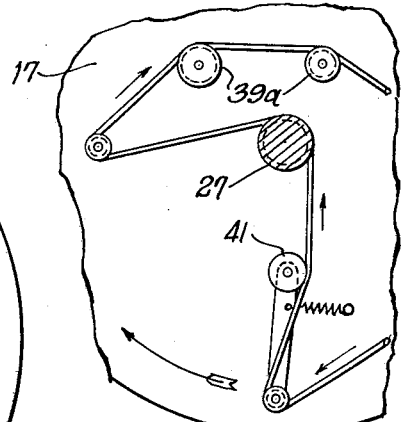
FIG. 5 is a fragment of the showing in FIG. 4, illustrating a belt-tensioning device.

The planet symbols are connected for joint rotation in the same direction when the turntable is in motion. According to FIG. 4, the planet symbols extend in a substantially semi-circular formation, while the sun symbol occurs in the hollow of such formation. The planet symbol spindles carry pulleys 39 at the bottom; and an endless belt 40 is trained in part along the outer sides of such pulleys, and in part around the inner side of the post 27, the belt seating in a peripheral groove 27a made in the post. Since the latter is fixed, the rotation of the turntable in the direction of the large arrow in FIG. 4 will find the post as a frictional deterrent drawing on the belt at one side and paying it out at the other side, this action causing the belt to travel and rotate the planet symbols by marginal friction with their pulleys. Also, the training of the belt along the inner side of the post 27 causes the planet symbols to rotate in the same direction as the turntable, as indicated by small arrows in FIG. 4. FIG. 5 shows planet symbol pulleys 39a made in different sizes for imparting different speeds of rotation to the planet symbols; and the same figure shows the use of a pressure idler 41 to tension the belt.

Figure 7:
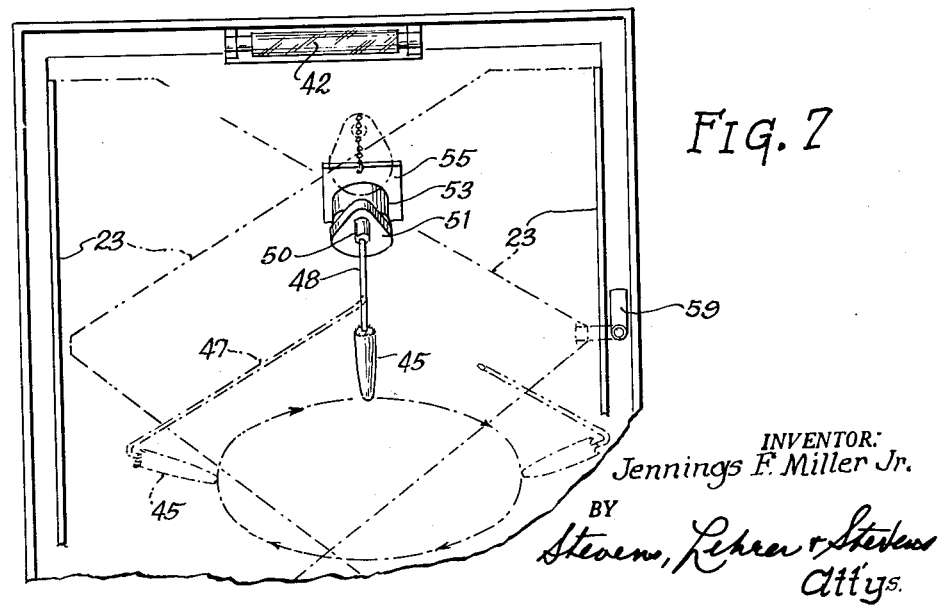
FIG. 7 is a view into the cover of the cabinet as seen from the line 7—7 of FIG. 6.

FIGS. 6 and 7 show that an ultra-violet lamp 42 is mounted within the frontal part of the cabinet cover 18, the ballast or transformer unit for the lamp being shown at 43. When the cover is raised as in FIG. 6 the rays of the lamp 42 cause the fluorescent coatings of the planet, satellite and asteroid symbols to shine, and light is cast by the sun symbol on the planets and satellites, illustrating the lighting effect of the sun on those bodies.

A comet is also represented in the instant display, the symbol of the same being carried by the cover of the cabinet. Thus, the symbol 45 is carried by a wire sweep arm 47 deflected from a spindle 48. The latter is removably fitted in a socket 50 carried by a speed-reduction gear box 51 extended from a small electric motor 53. The latter is suspended from a frame bar 55 hinged with one end to the cover 18, as indicated at 56. When the display is in use, the frame bar 55 is held in projected position by a chain 58 directed from the cover to the outer end of the frame bar. When the motor 53 is in operation, the comet symbol 45 revolves around the sun symbol in a wide circle, as indicated by dotted lines and arrows in FIGS. 6 and 7. Since the comet symbol is coated with a fluorescent substance in the manner of the other planet symbols, it will glow when the ultraviolet rays play on it, creating a realistic effect. When the display is not in use, the comet symbol is removed by withdrawing its spindle 48 from the socket 50. At this point the cover may be closed, in which event the motor 53 will yield in upward direction when it meets the turntable 17, folding against the cover.

In addition to their function to support the raised cover, the side wings 23 serve as side closures to shield the solar display from external light which may interfere with the ultra-violet rays cast in the cabinet and impair their efficiency. However, when the display is not in use, the wings may be folded to overlap each other as suggested by dotted lines in FIG. 7, and locked in the raised position by a suitable latch 59 to nest in the cover when the latter is closed.

Since marking the planet symbols is not practicable for easy identification by the viewer, FIG. 2 shows that the front wall of the cabinet bears a chart in the center showing the orbit-line locations of the planet symbols, and the names of the planets. Also, the four switches 60 marked in the circuit diagram are conveniently placed in the cabinet front alongside the planet-identifying chart.

In order to be in proportion with the other planetary symbols, that of the earth is quite small and of course unsuitable for geographic reference. For this purpose the earth symbol could be made removable for replacement when desired by a much larger globe E' suitable for geographic reference. Also, the earth symbol is mounted to revolve on an oblique axis and simulate the seasonal changes of the earth. Thus, the spindle 61 of the earth symbol E is obliquely journaled in a pulley 62 located under an opening 17a in the turntable 17; and the pulley is freely rotatable on a vertical axis by being suspended from a ball-bearing 63 carried by the turntable. A short belt 65 connects the pulley 62 with the post 27, so that the pulley will turn slowly when the turntable is in operation. The lower end of the spindle 61 has a pulley 66 which is engaged by the planet belt 40. It is now apparent that the earth symbol will be in rotation, while the pulley 62 revolves the earth symbol in the oblique position, lending a realistic impression of the earth's movements.

It will now be apparent that the novel display has a number of meritorious features. First, it presents an environment in which the solar system is spread out in miniature and third dimension before the eyes of the viewer. Further, the field of the planets and satellites is a turntable which simulates the revolution of the planetary system about the sun, with means for rotating the individual planets, so that the travel and action of the same teach the viewer what he cannot see in the space of the universe, but can only learn from books and charts. Further, a mechanical device of utmost simplicity is carried by the turntable for imparting rotation in the same direction to the planet symbols as the rotating direction of the turntable, in keeping with the findings of astronomy. Further, a cabinet is provided for the display which incorporates an ultra-violet unit effective on fluorescent coatings on the planet symbols, and a lighted sun symbol to simulate their illuminaiton by the sun and render the viewing of the display realistic and fascinating. Further, a comet symbol and its travel are incorporated in the display as an interesting phenomenon in the solar system. Finally, the display is housed in a cabinet which is portable and compact when the display is not in use, yet ready as an interesting and educational attraction when the cover is opened, the side wings set in place, and the switches turned on.

I claim:

1. A miniature solar system display comprising a stationary central support, a turntable rotatably mounted on the support and having a central opening, a stationary sun symbol above the turntable and secured to the support by way of said opening, planet symbols distributed about the sun symbol and journaled for rotation in the turntable, and drive means engaging the support frictionally for rotating the planet symbols in the same direction as the turntable when the latter is in rotation.

2. A miniature solar system display comprising a central support, a turntable rotatably mounted on the support and having a central opening, a sun symbol above the turntable and secured to the support by way of said opening, planet symbols distributed about the sun symbol and journaled for rotation in the turntable, and means for rotating the planet symbols when the turntable is in rotation, said support being a post, and said means being a belt engaging the planet symbols and the side of the post frictionally, whereby to cause the wrapping action of the belt around the post to draw the belt along the planet symbols and rotate the same.

3. The structure of claim 2, said support being a post, and said means being a belt engaging the planet symbols frictionally with one side and the side of the post frictionally with the other side, whereby to cause the wrapping action of the belt around the post to draw the belt along the planet symbols to rotate the same as stated.

4. The structure of claim 2, said support being a post, and said means being a belt engaging the planet symbols frictionally with its inner side and the side of the post frictionally with its outer side, whereby to cause the wrapping action of the belt around the post to draw the belt around the planet symbols to rotate the same as stated.

5. A miniature solar system display comprising a central support, a turntable rotatably mounted on the support and having a central opening, a sun symbol above the turntable and secured to the support by way of said opening, planet symbols distributed about the sun symbol and journaled for rotation in the turntable, and means for rotating the planet symbols when the turntable is in rotation, said support being a post, one of the planet symbols having an axial shaft oblique to the turntable, a bearing for said shaft journaled in the turntable for rotation in parallelism therewith, said bearing having the form of a pulley, and a belt connecting the latter with the post to revolve the planet symbol when the turntable is in rotation, whereby to continually change the angle of the planet symbol during its revolution about the sun symbol.

References Cited in the file of this patent

UNITED STATES PATENTS

| 1,478,099 | Bounds | Dec. 18, 1923 |
| 1,920,631 | Coumbopoulos | Aug. 1, 1933 |
| 2,226,032 | Wahlberg | Dec. 24, 1940 |
| 2,963,798 | Trippensee et al. | Dec. 13, 1960 |

OTHER REFERENCES

Popular Mechanics Publication, "Shining Fluorescent Stars Dot Celestial Sphere," April 1944, page 88.